United States Patent
D'Aprile et al.

(10) Patent No.: US 11,485,804 B2
(45) Date of Patent: Nov. 1, 2022

(54) METHOD FOR THE SYNTHESIS OF FLUOROPOLYMERS

(71) Applicant: SOLVAY SPECIALTY POLYMERS ITALY S.P.A., Bollate (IT)

(72) Inventors: Fiorenza D'Aprile, Nova Milanese (IT); Valeriy Kapelyushko, Alessandria (IT); Bradley Lane Kent, Woolwich Township, NJ (US); Giulio Brinati, Milan (IT); Laura Ponta, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 49 days.

(21) Appl. No.: 16/757,373

(22) PCT Filed: Oct. 16, 2018

(86) PCT No.: PCT/EP2018/078254
§ 371 (c)(1),
(2) Date: Apr. 17, 2020

(87) PCT Pub. No.: WO2019/076901
PCT Pub. Date: Apr. 25, 2019

(65) Prior Publication Data
US 2020/0247922 A1    Aug. 6, 2020

Related U.S. Application Data

(60) Provisional application No. 62/573,677, filed on Oct. 17, 2017.

(30) Foreign Application Priority Data

Nov. 2, 2017 (EP) .................................. 17199618

(51) Int. Cl.
*C08F 14/22* (2006.01)
*C08F 2/00* (2006.01)
*C08F 2/22* (2006.01)
*C08F 214/22* (2006.01)
*C08F 228/02* (2006.01)

(52) U.S. Cl.
CPC .............. *C08F 14/22* (2013.01); *C08F 2/001* (2013.01); *C08F 2/22* (2013.01); *C08F 214/225* (2013.01); *C08F 228/02* (2013.01)

(58) Field of Classification Search
None
See application file for complete search history.

(56) References Cited

U.S. PATENT DOCUMENTS

| | | | |
|---|---|---|---|
| 3,178,399 A * | 4/1965 | Lo .......................... | C08F 214/22 526/253 |
| 4,035,565 A | 7/1977 | Apotheker et al. | |
| 4,243,770 A | 1/1981 | Tatemoto et al. | |
| 4,281,092 A | 7/1981 | Breazeale | |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 5,447,993 A | 9/1995 | Logothetis | |
| 5,789,489 A | 8/1998 | Coughlin et al. | |
| 5,880,204 A * | 3/1999 | McCarthy .......... | C09D 151/003 524/520 |
| 6,869,997 B2 | 3/2005 | Wille et al. | |
| 8,337,725 B2 * | 12/2012 | Abusleme .............. | B01D 69/02 252/511 |
| 9,434,837 B2 | 9/2016 | Durali et al. | |
| 10,968,362 B2 * | 4/2021 | Carella .............. | H01M 50/449 |
| 2009/0221776 A1 * | 9/2009 | Durali ................... | C08F 214/22 526/249 |
| 2010/0036053 A1 * | 2/2010 | Aten ..................... | C08F 214/26 524/805 |
| 2010/0133482 A1 * | 6/2010 | Abusleme .............. | C08J 5/2237 252/511 |
| 2013/0150519 A1 * | 6/2013 | Durali ...................... | C08F 2/10 524/545 |

FOREIGN PATENT DOCUMENTS

| | | |
|---|---|---|
| EP | 199138 A2 | 10/1986 |
| WO | 2012084579 A1 | 6/2012 |
| WO | 2012175414 A1 | 12/2012 |

OTHER PUBLICATIONS

Standard ISO 13321—Particle size analysis—Photon correlation spectroscopy—Jul. 1, 1996—p. 1-20.

* cited by examiner

Primary Examiner — Nicole M. Buie-Hatcher
(74) Attorney, Agent, or Firm — Osha Bergman Watanabe & Burton LLP

(57) ABSTRACT

The present invention relates to a fluorosurfactant-free emulsion polymerization method for the synthesis of a fluoropolymer, more in particular of a VDF-based polymer.

13 Claims, No Drawings

METHOD FOR THE SYNTHESIS OF FLUOROPOLYMERS

CROSS-REFERENCE TO RELATED APPLICATIONS

This application is a U.S. national stage entry under 35 U.S.C. § 371 of International Application No. PCT/EP2018/078254 filed Oct. 16, 2018, which claims priority to US provisional patent application No. 62/573,677 filed on Oct. 17, 2017 and to European application No. 17199618.4, filed on Nov. 2, 2017. The entire contents of these applications are explicitly incorporated herein by this reference.

TECHNICAL FIELD

The present invention relates to a fluorosurfactant-free polymerization method for the synthesis of a fluoropolymer, more in particular of a polymer comprising vinylidene fluorine (VDF).

BACKGROUND ART

Emulsion polymerization methods typically used for the synthesis of fluoropolymers require a (per)fluorinated surfactant, which is used to stabilize the emulsion during the polymerization.

However, although the (per)fluorinated surfactants provide advantages for the synthesis, such as the avoidance of atom transfer between the growing polymer chain and the surfactant—which would result in inhibition of the of the polymerization reaction—, said (per)fluorinated surfactants are expensive and persist within the reaction environment.

In addition, fluorosurfactants such as perfluorooctanesulfonic acid (PFOS), perfluorooctanoic acid (PFOA), and perfluorononanoic acid (PFNA) caught the attention of regulatory agencies because of their persistence, toxicity, and widespread occurrence in the blood of general populations and wildlife. In 2009 PFASs were listed as persistent organic pollutants under the Stockholm Convention, due to their ubiquitous, persistent, bioaccumulative, and toxic nature. As a consequence, PFOS and PFOA have been replaced with short-chain perfluorinatedacids (PFASs), such as perfluorohexanoic acid (PFHxA), perfluorobutanesulfonic acid and perfluorobutane sulfonate (PFBS), as shorter fluorosurfactants should be less prone to accumulating in mammalians.

However, there is still concern that these compounds are chemically stable and may be persistent in the environment.

For this reason, methods for the synthesis of fluoropolymers that do not require the use of fluorosurfactants are currently under study and development.

For example, U.S. Pat. No. 9,434,837 (ARKEMA INC.) is directed to a method for preparing a fluoropolymer in an aqueous reaction medium, comprising:

a) forming an aqueous emulsion comprising at least one radical initiator, at least one acid-functionalized monomer and at least one fluoromonomer; and b) initiating polymerization of said acid-functionalized monomer and of said at least one fluoromonomer, using a free-radical initiator to form a stable latex emulsion copolymer, wherein the process uses no fluorosurfactant.

In addition to the acid-functionalized monomer, another surfactant is also used in the process to provide further stability to the polymer emulsion.

U.S. Pat. No. 6,869,997 (ARKEMA INC.) discloses a process comprising polymerizing at least one fluoromonomer in an aqueous reaction medium containing monomer, a radical initiator and a 3-allyloxy-2-hydroxy-1-propanesulfonic acid salt as surfactant. More in particular, this process comprises a first step (a) of charging a reactor with deionized water, at least one 3-allyloxy-2-hydroxy-1-propanesulfonic acid salt, and optionally one or more antifoulant, a chain-transfer agent and a buffering agent. Said step (a) is then followed by step (b) of heating the reactor to the desired temperature and by step (c) of feeding at least one fluoromonomer to the heated reactor. If necessary, step (d) of feeding to the heated reactor at least one radical initiator and at least one other surfactant or of feeding to heated reactor at least one fluoromonomer, can be performed.

SUMMARY OF INVENTION

The Applicant was well aware of the toxicological issues raised by the use of fluorosurfactants. Hence, the Applicant faced the problem of developing a method for the synthesis of fluoropolymers via aqueous emulsion polymerization, which does not require the use of fluorosurfactants.

More in particular, the Applicant faced the problem of providing a method for the synthesis of a vinylidene fluoride (VDF)-comprising polymer having improved thermal stability, notably upon exposure at high temperatures and light, said method being performed in the absence of any fluorosurfactant.

Also, the Applicant faced the problem of providing a method for the synthesis of a VDF-comprising polymer having an average particle size suitable for coating applications.

The Applicant noted that the method known in the art from U.S. Pat. No. 9,434,837 cited above, did not satisfy the above requirements. Indeed, the polymers obtained with the method therein disclosed were not stable upon heating at high temperature and did not have an average particle size suitable for coating applications, as the average particle size was too small, and hence the viscosity was not suitable for use in coating applications.

Thus, in a first aspect, the present invention relates to a method for the manufacture of a polymer [polymer (VDF)] comprising at least recurring units derived from 1,1-difluoroethylene (VDF), said method comprising the following steps:

(I) contacting at least a first portion of 1,1-difluoroethylene (VDF), with an aqueous medium and at least one polymerization initiator, thus providing a first mixture [mixture (M1)];

(II) polymerizing at least a part of said first portion of VDF, thus providing a second mixture [mixture (M2)];

(III) contacting said mixture (M2) obtained in step (II) with at least a first portion of at least one acid-functionalized compound [compound (A)], or the corresponding alkali metal, alkaline earth metal or ammonium salt of such compound thus providing a third mixture [mixture (M3)]; and (IV) polymerizing said mixture (M3) obtained in step (III) by feeding at least a second portion of VDF, thus providing said polymer (VDF).

In a second aspect, the present invention relates to a vinylidene fluoride (VDF)-comprising polymer [polymer (VDF)] obtained by the process as defined above.

In a further aspect, polymer (VDF) according to the present invention comprises chain ends of formula —$CF_2$—

CH$_2$—CH$_3$ in an amount of less than 10% based on the total amount of chain ends of said polymer (VDF).

DETAILED DESCRIPTION

As used within the present description and in the following claims:
- the use of parentheses around symbols or numbers identifying the formulae, for example in expressions like "polymer (P)", etc., has the mere purpose of better distinguishing the symbol or number from the rest of the text and, hence, said parenthesis can also be omitted;
- the terms "1,1-difluoroethylene", "1,1-difluoroethene" and "vinylidene fluoride" are used as synonyms;
- the terms "poly-(1,1-difluoroethylene)" and "polyvinylidene fluoride" are used as synonyms;
- the term "amorphous" referred to "polymer (VDF)" is intended to indicate that said polymer (VDF) has a low degree of crystallinity (crystalline phase less than 20% by volume) and a glass transition temperature (Tg) below room temperature, preferably the Tg is below 10° C., preferably below 5° C., more preferably 0° C.;
- the expression "amorphous polymer (VDF)" is used as synonym of "fluoroelastomer";
- the expression "partially crystalline" referred to "polymer (VDF)" is intended to indicate that said polymer has a degree of crystalline of at least 20% by volume, preferably at least 40% by volume;
- the expression "crystalline" referred to "polymer (VDF)" is intended to indicate that said polymer has a degree of crystalline of at least 50% by volume, preferably up to 70% by volume;
- the expression "polymer (VDF) comprising recurring units derived from 1,1-difluoroethylene" is intended to indicate that polymer (P) is obtained by reacting together at least 1,1-difluoroethylene monomers, optionally in the presence of at least one further monomer (MF), via a suitable reaction;
- the term "dispersion (D)" is intended to indicate an aqueous dispersion comprising particles of at least one polymer (VDF), said particles having an average size of less than 1 μm, as measured according to ISO 13321, and hence the terms "dispersion (D)" and "latex" are intended as synonyms.

In said step (I) of the polymerization, it can be advantageous to incorporate an effective amount of a polymer that acts as nucleating agent aiding in promoting the production of an aqueous dispersion of particles having a proper average particles size. The polymer may be selected from the group consisting of polyether polymers, allyl polymers, vinyl polymers and the like, preferably from vinyl polymer.

The vinyl polymer useful in this invention may be selected from polymers obtained by polymerization of monomers having vinyl or allyl functionality, and containing a carboxyl, phosphonate, sulfonate, or other anionically chargeable group, or the corresponding alkali metal, alkaline earth metal or ammonium salt of such monomer.

Examples of suitable monomers include acrylic acid, methacrylic acid, maleic acid, fumaric acid, itaconic acid, vinyl acetic acid, vinyl sulfonic acid, styrene sulfonic acid, vinyl phosphonic acid, allyl sulfonic acid, allyl phosphonic acid, and water soluble alkali metal, alkaline earth metal, or ammonium salts thereof. Said monomers may optionally include at least one halide atom, fluoride atom in particular.

Particularly suitable vinyl polymers useful in this invention are poly(vinylsulfonic) acid and salts thereof, poly(vinylacetic) acid and salts thereof and poly(acrylic) acid and salts thereof.

Said vinyl polymer can be added to the reaction mixture in step (I) of the process as such or in the form of latex or of dispersion in aqueous medium.

Alternatively, the vinyl polymer as above defined can be added in step (II) of the polymerization, either as such or in the form of latex or of dispersion in aqueous medium.

The amount of vinyl polymer useful in this invention either when added in step (I) or in step (II) of the process is generally not more than 30% by weight based on the weight of said compound (A).

Preferably, the polymerization in said step (II) is performed until said VDF reaches a conversion of at least 0.5%, more preferably of at least 1%, the conversion being defined as [(mass of polymer formed/mass of total polymer)×100].

Preferably, the polymerization in said step (II) is performed until said VDF reaches a conversion up to 15%, more preferably of at least 10%, the conversion being as defined above.

It will be apparent to the person skilled in the art that at the end of step (II), said mixture (M2) comprises said aqueous medium, said polymerization initiator, the non-polymerized part of said first portion of VDF and particles comprising the polymerized part of said first portion of VDF.

Advantageously, said compound (A) contains at least one vinyl group and at least one sulfonic acid or salt thereof with an alkaline metal.

Preferably, said compound (A) complies with the following formula (A-I):

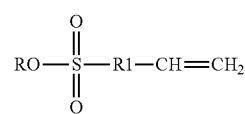

(A-I)

wherein
R is a hydrogen atom, an ammonium ion or an alkaline metal ion; more preferably R is an alkaline metal ion; even more preferably R is selected from sodium or potassium;
R1 is a sigma bond or an alkyl chain comprising from 1 to 3 carbon atoms; more preferably R1 is a sigma bond.

Without being bound by any theory, the Applicant is of the opinion that compound (A) either reacts with the VDF, and when used with monomer (F), thus becoming a further monomer within the backbone of final polymer (VDF), or it acts as surfactant within the reaction environment.

Preferably, said step (IV) is performed by feeding—at the same time of said second portion of VDF—a second portion of said at least one compound (A).

Said step (IV) can be performed by feeding 1,1-difluoroethylene (VDF) and said at least one compound (A) in continuous, or stepwise as successive portions.

Advantageously, in step (IV) said 1,1-difluoroethylene is fed continuously.

Good results have been obtained by feeding said compound (A) in successive portions. However, the embodiment wherein said compound (A) is fed continuously is also encompassed by the present invention.

Advantageously, the process according the present invention allows to manufacture crystalline, partially crystalline or amorphous polymer (VDF).

According to a first preferred embodiment, said polymer (VDF) is a homo-polymer of VDF [polymer (VDF$_H$)], i.e., it essentially consists of recurring units derived from VDF (also referred to as 1,1-difluoroethylene).

According to this embodiment, said polymer (VDF$_H$) comprises an amount of recurring units derived from VDF up to 100 mol. %.

Said polymer (VDF$_H$) may still comprise other moieties such as defects, end-groups and the like, which do not affect nor impair its physical-chemical properties.

Advantageously, said polymer (VDF$_H$) is crystalline.

According to an embodiment, said step (I) is performed by contacting said at least a first portion of VDF with at least a first portion of at least one fluorinated monomer different from VDF [monomer (F)];

said step (II) is performed by polymerizing said at least a part of said first portion of VDF with said at least a part of said monomer (F);

said step (III) is as defined above;

said step (IV) is performed by polymerizing said mixture (M3) by feeding at least said second portion of VDF, said at least one compound (A) and at least a second portion of said at least one monomer (F).

It will be apparent to the person skilled in the art that at the end of step (II) of this embodiment, said mixture (M2) comprises said aqueous medium, said polymerization initiator, the non-polymerized part of said first portion of VDF and of said at least one monomer (F) and particles comprising the polymerized part of said first portion of VDF and of said first portion of at least one monomer (F).

According to this embodiment, said polymer (VDF) is a copolymer of VDF [polymer (VDF$_C$)], i.e. it comprises recurring units derived from VDF (also referred to as 1,1-difluoroethylene) and recurring units derived from at least one fluorinated monomer different from VDF [monomer (F)].

Said monomer (F) can be either a hydrogenated monomer [monomer (F$_H$)] or a fluorinated monomer [monomer (F$_F$)].

By the term "hydrogenated monomer [monomer (F$_H$)]", it is hereby intended to denote an ethylenically unsaturated co-monomer free of fluorine atoms.

Non-limitative examples of suitable monomers (F$_H$) include, notably, ethylene, propylene, vinyl monomers such as vinyl acetate, as well as styrene monomers, like styrene and p-methylstyrene.

By the term "fluorinated monomer [monomer (F$_F$)]", it is hereby intended to denote an ethylenically unsaturated co-monomer comprising at least one fluorine atom.

In a preferred embodiment, said monomer (F) is monomer (F$_F$).

Non-limitative examples of suitable monomers (F$_F$) include, notably, the followings:

(a) $C_2$-$C_8$ fluoro- and/or perfluoroolefins, such as tetrafluoroethylene (TFE), hexafluoropropylene (HFP), pentafluoropropylene and hexafluoroisobutylene;

(b) $C_2$-$C_8$ hydrogenated monofluoroolefins, such as vinyl fluoride, 1,2-difluoroethylene and trifluoroethylene;

(c) $CH_2=CH-R_{f0}$, wherein $R_{f0}$ is a $C_1$-$C_6$ perfluoroalkyl group;

(d) chloro- and/or bromo- and/or iodo-$C_2$-$C_6$ fluoroolefins such as chlorotrifluoroethylene (CTFE);

(e) $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;

(f) $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(g) $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $-C_2F_5-O-CF_3$;

(h) (per) fluorodioxoles of formula:

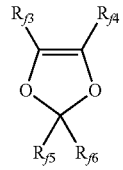

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_{20}CF_3$.

Most preferred monomers (F$_F$) are tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride.

Advantageously, polymer (VDF$_C$) according to the present invention can be crystalline, partially crystalline or amorphous.

When said polymer (VDF$_C$) is crystalline or partially crystalline, it preferably comprises from 0.05% to 14.5% by moles, preferably from 1.0% to 13.0% by moles, of recurring units derived from said monomer(s) (F), with respect to the total moles of recurring units of polymer (VDF).

According to this embodiment, said monomer (F) is preferably selected from monomer (F$_F$) as detailed above.

According to a preferred embodiment, said crystalline or partially crystalline polymer (VDF$_C$) comprises an amount of recurring units derived from VDF of at least 85.0 mol. %, preferably of at least 86.0 mol. %, more preferably at least 87.0 mol. %, so as not to impair the excellent properties of vinylidene fluoride resin, such as chemical resistance, weatherability, and heat resistance. For instance, when said crystalline or partially crystalline polymer (VDF$_C$) comprises an amount of recurring units derived from VDF of less than 85.0 mol. %, it cannot be used for formulating coating compositions for making composite separators for batteries, as the corresponding polymer would dissolve in the liquid solvent used as electrolyte liquid phase.

When said polymer (VDF$_C$) is amorphous, it preferably comprises at least recurring units derived from HFP.

In this case, amorphous polymer (VDF$_C$) typically comprises at least 10% moles, preferably at least 12% moles, more preferably at least 15% moles of recurring units derived from HFP, with respect to all recurring units of said polymer (VDF$_C$).

Still, amorphous polymer (VDF$_C$) typically comprises at most 45% moles, preferably at most 40% moles, more preferably at most 35% moles of recurring units derived from HFP, with respect to all recurring units of the polymer (VDF$_C$).

Amorphous polymer (VDF$_C$) may comprise, in addition to recurring units derived from VDF and HFP, one or more of the followings:

recurring units derived from at least one bis-olefin [bis-olefin (OF)] having general formula:

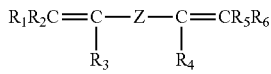

wherein R1, R2, R3, R4, $R_5$ and R6, equal or different from each other, are H, a halogen, or a $C_1$-O5 optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;

recurring units derived from at least one (per)fluorinated monomer different from VDF and HFP; and
  recurring units derived from at least one hydrogenated monomer.

Examples of hydrogenated monomers are notably non-fluorinated alpha-olefins, including ethylene, propylene, 1-butene, diene monomers, styrene monomers, alpha-olefins being typically used. $C_2$-$C_8$ non-fluorinated alpha-olefins (OI), and more particularly ethylene and propylene, will be selected for achieving increased resistance to bases.

The bis-olefin (OF) is preferably selected from the group consisting of those complying with formulae (OF-1), (OF-2) and (OF-3):

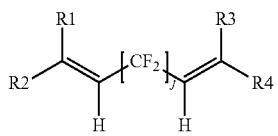
(OF-1)

wherein j is an integer between 2 and 10, preferably between 4 and 8, and $R_1$, $R_2$, $R_3$, $R_4$, equal or different from each other, are H, F or $C_{1-5}$ alkyl or (per)fluoroalkyl group;

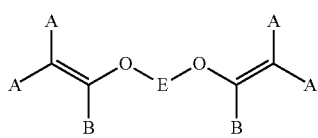
(OF-2)

wherein each of A, equal or different from each other and at each occurrence, is independently selected from F, Cl, and H;

each of B, equal or different from each other and at each occurrence, is independently selected from F, Cl, H and $OR_B$, wherein $R_B$ is a branched or straight alkyl chain, which can be partially, substantially or completely fluorinated or chlorinated;

E is a divalent group having 2 to 10 carbon atom, optionally fluorinated, which may be inserted with ether linkages; preferably E is a —$(CF_2)_m$— group, with m being an integer from 3 to 5;

a preferred bis-olefin of (OF-2) type is $F_2C$=CF—O—$(CF_2)_5$—O—CF=$CF_2$.

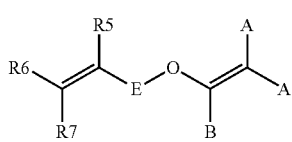
(OF-3)

wherein E, A and B have the same meaning as above defined; $R_5$, $R_6$, $R_7$, equal or different from each other, are H, F or $C_{1-5}$ alkyl or (per)fluoroalkyl group.

When a bis-olefin is employed, the resulting amorphous polymer ($VDF_C$) typically comprises from 0.01% to 5% by moles of units deriving from the bis-olefin with respect to the total amount of units of said amorphous polymer ($VDF_C$).

Optionally, said amorphous polymer ($VDF_C$) may comprise cure sites, either as pendant groups bonded to certain recurring units or as ends groups of the polymer chain, said cure sites comprising at least one iodine or bromine atom, more preferably at least one iodine atom.

Among cure-site containing recurring units, mention can be notably made of:

(CSM-1) iodine or bromine containing monomers of formula:

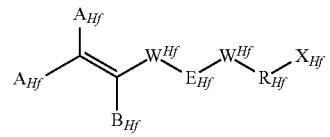

wherein each of $A_{Hf}$, equal to or different from each other and at each occurrence, is independently selected from F, Cl, and H; $B_{Hf}$ is any of F, Cl, H and $OR^{Hf}_B$, wherein $R^{Hf}_B$ is a branched or straight chain alkyl radical which can be partially, substantially or completely fluorinated or chlorinated; each of $W^{Hf}$ equal to or different from each other and at each occurrence, is independently a covalent bond or an oxygen atom; $E_{Hf}$ is a divalent group having 2 to 10 carbon atom, optionally fluorinated; $R_{Hf}$ is a branched or straight chain alkyl radical, which can be partially, substantially or completely fluorinated; and $R_{Hf}$ is a halogen atom selected from the group consisting of Iodine and Bromine; which may be inserted with ether linkages; preferably E is a —$(CF_2)_m$— group, with m being an integer from 3 to 5;

(CSM-2) ethylenically unsaturated compounds comprising cyanide groups, possibly fluorinated.

Among cure-site containing monomers of type (CSM1), preferred monomers are those selected from the group consisting of:

(CSM1-A) iodine-containing perfluorovinylethers of formula:

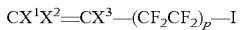

with m being an integer from 0 to 5 and n being an integer from 0 to 3, with the provision that at least one of m and n is different from 0, and Rfi being F or $CF_3$; (as notably described in U.S. Pat. No. 4,745,165 (AUSIMONT S.P.A.), U.S. Pat. No. 4,564,662 (MINNESOTA MINING) and EP 199138 A (DAIKIN IND., LTD.); and (CSM-1B) iodine-containing ethylenically unsaturated compounds of formula:

$CX^1X^2$=$CX^3$—$(CF_2CF_2)_p$—I wherein each of $X^1$, $X^2$ and $X^3$, equal to or different from each other, are independently H or F; and p is an integer from 1 to 5; among these compounds, mention can be made of $CH_2$=$CHCF_2CF_2I$, $I(CF_2CF_2)_2CH$=$CH_2$, $ICF_2CF_2CF$=$CH_2$, $I(CF_2CF_2)_2CF$=$CH_2$;

(CSM-1C) iodine-containing ethylenically unsaturated compounds of formula:

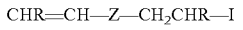

CHR=CH—Z—$CH_2$CHR—I wherein R is H or $CH_3$, Z is a $C_1$-$C_{18}$ (per)fluoroalkylene radical, linear or branched, optionally containing one or more ether oxygen atoms, or a (per)fluoropolyoxyalkylene radical; among these compounds, mention can be made of CH$_2$=CH—(CF$_2$)$_4$CH$_2$CH$_2$I, CH$_2$=CH—(CF$_2$)$_6$CH$_2$CH$_2$I, CH$_2$=CH—(CF$_2$)$_8$CH$_2$CH$_2$I, CH$_2$=CH—(CF$_2$)$_2$CH$_2$CH$_2$I;

(CSM-1D) bromo and/or iodo alpha-olefins containing from 2 to 10 carbon atoms such as bromotrifluoroethylene or bromotetrafluorobutene described, for example, in U.S. Pat. No. 4,035,565 (DU PONT) or other compounds bromo and/or iodo alpha-olefins disclosed in U.S. Pat. No. 4,694,045 (DU PONT).

Among cure-site containing monomers of type (CSM2), preferred monomers are those selected from the group consisting of:

(CSM2-A) perfluorovinyl ethers containing cyanide groups of formula

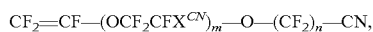

wherein $X^{CN}$ is F or CF$_3$; m is 0, 1, 2, 3 or 4; n is an integer from 1 to 12;

(CSM2-B) perfluorovinyl ethers containing cyanide groups of formula

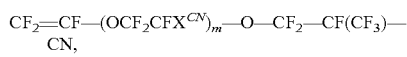

wherein $X^{CN}$ is F or CF$_3$; m' is 0, 1, 2, 3 or 4.

Specific examples of cure-site containing monomers of type CSM2-A and CSM2-B suitable to the purposes of the present invention are notably those described in U.S. Pat. No. 4,281,092 (DU PONT), U.S. Pat. No. 5,447,993 (DU PONT) and U.S. Pat. No. 5,789,489 (DU PONT).

Preferably, said amorphous polymer (VDF$_C$) comprises iodine or bromine cure sites in an amount of 0.001 to 10 wt. %. Among these, iodine cure sites are those selected for maximizing curing rate, so that (per)fluoroelastomers comprising iodine cure-sites are preferred.

According to this embodiment, for ensuring acceptable reactivity it is generally understood that the content of iodine and/or bromine in the amorphous polymer (VDF$_C$) should be of at least 0.05 wt. %, preferably of at least 0.1 wt. %, more preferably of at least 0.15 wt. %, with respect to the total weight of said amorphous polymer (VDF$_C$).

On the other side, amounts of iodine and/or bromine not exceeding preferably 7% wt., more specifically not exceeding 5% wt., or even not exceeding 4% wt., with respect to the total weight of said amorphous polymer (VDF$_C$), are those generally selected for avoiding side reactions and/or detrimental effects on thermal stability.

These iodine or bromine cure sites of these preferred embodiments of the invention might be comprised as pending groups bound to the backbone of said amorphous polymer (VDF$_C$) (by means of incorporation in the polymer chain of recurring units derived from monomers of (CSM-1) type, as above described, and preferably of monomers of (CSM-1A) to (CSM1-D), as above detailed) or might be comprised as terminal groups of said polymer chain.

According to a first embodiment, the iodine and/or bromine cure sites are comprised as pending groups bound to the backbone of the amorphous polymer (VDF$_C$) chain. The amorphous polymers (VDF$_C$) according to this embodiment generally comprise recurring units derived from iodine or bromine containing monomers (CSM-1) in amounts of 0.05 to 5 mol per 100 mol of all other recurring units of the (per)fluoroelastomer, so as to advantageously ensure above mentioned iodine and/or bromine weight content.

According to a second preferred embodiment, the iodine and/or bromine cure sites are comprised as terminal groups of the amorphous polymer (VDF$_C$) chain.

Amorphous polymers (VDF$_C$) according to this embodiment are generally obtained by addition to the polymerization medium during fluoroelastomer manufacture of anyone of:

iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \le x+y \le 2$ (see, for example, U.S. Pat. No. 4,243,770 (DAIKIN IND., LTD.) and U.S. Pat. No. 4,943,622 (NIPPON MEKTRON KK.); and alkali metal or alkaline-earth metal iodides and/or bromides, such as described notably in U.S. Pat. No. 5,173,553 (AUSIMONT SRL.).

Preferred polymers (VDF$_C$) are those having following compositions (in mol. %):

vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;

vinylidene fluoride (VDF) 50-80%, perfluoroalkyl vinyl ethers (PAVE) 5-50%, tetrafluoroethylene (TFE) 0-20%, bis-olefin (OF) 0-5%;

vinylidene fluoride (VDF) 20-30%, C$_2$-C$_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%;

tetrafluoroethylene (TFE) 50-80%, perfluoroalkyl vinyl ethers (PAVE) 20-50%, bis-olefin (OF) 0-5%;

tetrafluoroethylene (TFE) 45-65%, C$_2$-C$_8$ non-fluorinated olefins (Ol) 20-55%, vinylidene fluoride 0-30%, bis-olefin (OF) 0-5%;

tetrafluoroethylene (TFE) 32-60% mol %, C$_2$-C$_8$ non-fluorinated olefins (Ol) 10-40%, perfluoroalkyl vinyl ethers (PAVE) 20-40%, fluorovinyl ethers (MOVE) 0-30%, bis-olefin (OF) 0-5%;

tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

vinylidene fluoride (VDF) 35-85%, fluorovinyl ethers (MOVE) 5-40%, per-fluoroalkyl vinyl ethers (PAVE) 0-30%, tetrafluoroethylene (TFE) 0-40%, hexa-fluoropropene (HFP) 0-30%, bis-olefin (OF) 0-5%;

tetrafluoroethylene (TFE) 20-70%, fluorovinyl ethers (MOVE) 30-80%, per-fluoroalkyl vinyl ethers (PAVE) 0-50%, bis-olefin (OF) 0-5%.

More preferred polymers (VDF$_C$) are those comprising vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%.

Polymer (VDF) is advantageously provided in the form of particles.

Advantageously, particles of said polymer (VDF) are obtained at the end of step (IV) of the method of the present invention.

Preferably, the particles of polymer (VDF) possess a primary particle average size of less than 1 μm.

For the purpose of the present invention, the term "primary particles" is intended to denote primary particles of polymer (VDF) deriving directly from aqueous emulsion polymerization process, without isolation of the polymer from the emulsion.

Primary particles of polymer (VDF) are thus to be intended distinguishable from agglomerates (i.e. collection of primary particles), which might be obtained by recovery and conditioning steps of such polymer manufacture such as concentration and/or coagulation of aqueous latexes of the polymer (VDF) and subsequent drying and homogenization to yield the respective powder.

According to a preferred embodiment, at the end of said step (IV) a dispersion [dispersion (D)] comprising particles of said polymer (VDF) is obtained.

Dispersion (D) according to the present invention is thus distinguishable from an aqueous slurry that can be prepared by dispersing powders of a polymer in an aqueous medium. The average particle size of powders of a polymer or copolymer dispersed in an aqueous slurry is typically higher than 1 µm, as measured according to ISO 13321.

Preferably, the primary particles average size of the particles of polymer (VDF) in said dispersion (D) is above 50 nm, more preferably above 100 nm, even more preferably above 150 nm as measured according to ISO 13321.

Preferably, the primary particles average size is below 600 nm, more preferably below 400 nm and even more preferably below 350 nm as measured according to ISO 13321.

More preferably, the primary particles average size of the particles of polymer (VDF) in said dispersion (D) is from 180 nm to 320 nm as measured according to ISO 13321.

As said, dispersion (D) is substantially free from fluorinated surfactants.

The expression "substantially free" in combination with the amount of fluorinated surfactants in dispersion (D) is to be meant to exclude the presence of any significant amount of said fluorinated surfactants, e.g. requiring the fluorinated surfactants to be present in an amount of less than 1 ppm, with respect to the total weight of dispersion (D).

Polymerization pressure ranges typically between 20 and 70 bar, preferably between 25 and 65 bar.

Polymerization temperature can be properly selected by the person skilled in the art on the basis of the monomers used. Preferably, the reaction temperature ranges from 80° C. to 150° C.

The aqueous emulsion polymerization process as detailed above is typically carried out in the presence of at least one radical initiator.

While the choice of the radical initiator is not particularly limited, it is understood that radical initiators suitable for an aqueous emulsion polymerization process are selected from compounds capable of initiating and/or accelerating the polymerization process and include, but are not limited to, persulfates, such as sodium, potassium and ammonium persulfates; organic peroxide, including notably alkyl peroxide, dialkyl peroxide (such as di-tert-butylperoxide— DTBP), diacyl-peroxide, peroxydicarbonates (such as di-n-propyl peroxydicarbonate and diisopropyl peroxydicarbonate), peroxy esters (such as tert-amyl peroxypivalate, tertbutyl peroxypivalate and succinic acid peroxide); and mixtures thereof.

The radical initiator may optionally comprise an azo initiator, such as for example 2,2'-azobis(2-methylpropionamidine)dihydrochlorlde.

The radical initiator may comprise a redox system. By "redox system" is meant a system comprising an oxidizing agent, a reducing agent and optionally, an electron transfer medium.

Oxidizing agents include, for example, persulfate salts; peroxides, such as hydrogen peroxide; hydroperoxides such as tertbutyl hydroperoxide and cumene hydroperoxide; and oxidizing metal salts such as, for example, ferric sulfate.

Reducing agents include, for example, sodium formaldehyde sulfoxylate, sodium and potassium sulfite, ascorbic acid, bisulfite, metabisulfite, and reduced metal salts.

One or more radical initiators as defined above may be added to the aqueous medium as defined above in an amount ranging advantageously from 0.001% to 2% by weight based on the weight of the aqueous medium or in an amount of from 0.5% to 2.5% by weight based on the total weight of said compound (A).

Said aqueous medium is advantageously water, more preferably deionized water.

Should the disclosure of any patents, patent applications, and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

Experimental Section

Materials and Methods

Vinyl sulfonic acid sodium salt (VSA) solution 25 wt. % was obtained from Sigma.

Average particles size of the latex was measured according to ISO 13321.

Average number molecular weight (Mn) and average weight molecular weight (Mw) were determined by GPC analysis according to ISO 16014, using N,N-dimethylacetamide as a solvent and polystyrene narrow standard for calibration.

The end groups of the polymers were quantificated by NMR analysis, by recording the NMR spectra at 60° C. on a Varian VNMS 500 NMR spectrometer operating at 499.86 MHz for $^1$H and 470.28 MHz for $^{19}$F using a Triple HFCP-PFG probe with 5 mm 502-8 (Norell, Inc.) NMR sample tubes. The NMR experiments were carried out using 40 mg of sample solution in 0.75 ml of deuterated acetone (99.9% D, obtained from Sigma-Aldrich) with tetramethylsilane (TMS) used as an internal standard. $^1$H was performed using 45 degree pulse length of 5.05 us, 5 s relaxation delay, 2.3 s acquisition time, 16 K complex points, 7 kHz spectral width and 1500 repetitions.

$^{19}$F was performed using 45 degree pulse length of 4.44 us, 5 s relaxation delay, 0.695 s acquisition time, 16 K complex points, 23.5 kHz spectral width and 2000 repetitions.

The determination of the amount of the end groups (EG), expressed in mols/10000 VDF units, was reckoned using the following expression:

$$[EG][mols/10000VDF\ units]=10000\times I_{EG}/I_{TOT}$$

where $I_{EG}$ are normalized integrated intensities of the corresponding endgroup signals, $I_{TOT}$ is the sum of all the normalized integrated intensities of EG and VDF units.

Synthesis 1

A 7.5 liter horizontally disposed stainless steel reactor was charged with 0.004 kg of paraffin wax and then with 5.31 kg of deionized water. The reactor was agitated and temperature was raised to 122.5° C.

The reactor was sealed, purged, and 1,1-difluoroethylene (VF$_2$) monomers were charged to a pressure of about 44.8 bar.

The total amount of 30 mL of ditertbutyl peroxide (DTBP) as initiator was added as a whole. The reactor pressure was maintained at about 44-46 bar by the addition of VF$_2$ as needed.

After at least 5% of conversion of the VF$_2$ monomers, 12 g of an aqueous dispersion containing VSA was added stepwise (2.0 g each step, for a time of 10 min for each step).

The feed of VF$_2$ was stopped at 3.5 hours, after 1.0 kg had been fed to the reactor. Maintaining slow agitation, the reactor was cooled down to room temperature and vented. Latex 1 thus obtained was discharged and reactor was rinsed by water.

Synthesis 2—Comparative

A procedure similar to that disclosed in Synthesis 1 was followed, but VSA was fully added at the beginning of the reaction.

A 7.5 liter horizontally disposed stainless steel reactor was charged with 5.23 kg of deionized water and 24 g of an aqueous dispersion containing VSA.

The reactor was agitated and temperature was raised to about 60° C. The reactor was then charged with 0.004 kg of paraffin wax, and then the temperature was raised to 122.5° C. The reactor was sealed, purged, and VF$_2$ monomer was charged to a pressure of about 44.8 bar.

The total amount of 30 mL ditertbutyl peroxide (DTBP) as initiator was added as a whole. The reactor pressure was maintained at about 44-46 bar by the addition of VF$_2$ as needed.

The feed of VF$_2$ was stopped at 2.8 hours, after 1.0 kg had been fed to the reactor. Maintaining slow agitation, the reactor was cooled down to room temperature and vented. Latex 2 thus obtained was discharged and reactor was rinsed by water.

Synthesis 3—Comparative

A procedure similar to that disclosed in Synthesis 1 was followed, but VSA was fully added at the beginning of the reaction.

A 7.5 liter horizontally disposed stainless steel reactor was charged with 5.23 kg of deionized water and 12 g of an aqueous dispersion containing VSA.

The reactor was agitated and temperature was raised to about 60° C. The reactor was then charged with 0.004 kg of paraffin wax, and then the temperature was raised to 122.5° C. The reactor was sealed, purged, and VF$_2$ monomer was charged to a pressure of about 44.8 bar.

The total amount of 30 mL ditertbutyl peroxide (DTBP) as initiator was added as a whole. The reactor pressure was maintained at about 44-46 bar by the addition of VF$_2$ as needed.

The feed of VF$_2$ was stopped at 2.8 hours, after 1.0 kg had been fed to the reactor. Maintaining slow agitation, the reactor was cooled down to room temperature and vented. Latex 3 thus obtained was discharged and reactor was rinsed by water.

Synthesis 4

A procedure similar to that disclosed in Synthesis 1 was followed, but poly(vinylsulfonic) acid, sodium salt was added after the addition of DTBP.

Latex 4 having a solid content of 30% by weight and average particles size of around 270 nm-300 nm was obtained.

The average number molecular weight, the average weight molecular weight and the average particles size of the polymers obtained in Synthesis 1, 2 and 3 were evaluated and reported in the following Table 1.

Example 1—Yellow Index (YI)

5 g of powder obtained from each Latex 1, 2(*) and 3(*) obtained as disclosed above, were poured into an aluminum cup (50 mm diameter) and put into a pre-heated oven at 240° C. After 1 hour, the cup was removed from the oven and let cool down to room temperature.

Yellow Index of the powder thus obtained was measured directly in the cup using a Gardner Colorimeter, according to ASTM E313-00, "Standard practice for calculating Yellowness and Whiteness indices from Instrumentally Measured Color Coordinates".

Rating was in the range from 0 to 100, wherein 0 corresponded to YI=0, and 100 was assumed for dark, out-of-range, samples.

Samples passed the test (OK) when YI was lower than or equal to 50; samples do not pass the test (KO) when YI value was higher than 50.

The results are reported in the following Table 1.

TABLE 1

| Latex | Average particles size | Mn | Mw | Yellow Index (YI) |
|---|---|---|---|---|
| 1 | 189 nm | 143000 | 491000 | OK |
| 2(*) | 83 nm | 50000 | 112000 | KO |
| 3(*) | 72 nm | | | KO |

(*)comparative

Example 2—Viscosity

Viscosity was evaluated based on the so-called "Grind Dispersion" on a Hegman gauge, and then KU viscosity was measured on a Brookfield KU-2 viscometer.

The following materials were placed into a 1 L polyethylene bottle: 139.1 g isophorone, 60.9 g Paraloid™ B-44S (obtained from Dow and used as such: 40 wt. % solution of B-44 acrylic copolymer in toluene), 100 g of powder from Latexes 1 and 2(*) obtained as disclosed above, 300 g of glass beads of diameter 3.4 to 4.0 mm.

The mixture was shaken on a Red Devil paint shaker for 5.5 hours to fully disperse the powder. After shaking, the glass beads were separated from the dispersion by filtration through a 240 micron filter. The dispersion was sealed in a metal paint can to rest overnight. The next day, the KU viscosity of the dispersion was measured.

The results are reported in the following Table 2.

TABLE 2

| Dispersion comprising Latex | KU Viscosity |
|---|---|
| 1 | 79.1 |
| 2(*) | 112 |

The invention claimed is:

1. A method for the manufacture of a polymer (VDF) comprising at least recurring units derived from 1,1-difluoroethylene (VDF), said method comprising:
 (I) contacting at least a first portion of 1,1-difluoroethylene (VDF), with an aqueous medium and at least one polymerization initiator, thus providing a first mixture (M1);
 (II) polymerizing at least a part of said first portion of VDF, thus providing a second mixture (M2);
 (III) contacting said mixture (M2) with at least a first portion of at least one acid-functionalized compound (A), or the corresponding alkali metal, alkaline earth metal or ammonium salt of such compound (A), wherein compound (A) contains at least one vinyl group, thus providing a third mixture (M3); and (IV) polymerizing said mixture (M3) by feeding at least a second portion of VDF, thus providing said polymer (VDF);
wherein the polymerization in said step (II) is performed until VDF reaches a conversion of at least 0.5% and up to 15%, the conversion being defined as ((mass of polymer formed/mass of total polymer)×100).

2. The method according to claim 1, wherein said compound (A) contains at least one sulfonic acid or salt thereof with an alkaline metal.

3. The method according to claim 2, wherein said compound (A) complies with the following formula (A-1):

RO—S(=O)$_2$-R1-CH=CH$_2$ (A-1)

wherein
R is a hydrogen atom, an ammonium ion or an alkaline metal ion;
R1 is a sigma bond or an alkyl chain comprising from 1 to 3 carbon atoms.

4. The method according to claim 1, wherein said polymer (VDF) is a homo-polymer of VDF (polymer (VDF$_H$)) consisting essentially of recurring units derived from VDF.

5. The method according to claim 1, wherein
said step (I) is performed by contacting said at least a first portion of VDF with at least a first portion of at least one fluorinated monomer different from VDF (monomer (F));
said step (II) is performed by polymerizing said at least a part of said first portion of VDF with said at least a part of said monomer (F);
said step (III) is as defined in claim 1; and
said step (IV) is performed by polymerizing said mixture (M3) by feeding at least said second portion of VDF.

6. The method according to claim 5, wherein said step (IV) is performed by feeding at least a second portion of said at least one compound (A) and/or at least a second portion of said at least one monomer (F).

7. The method according to claim 5, wherein said polymer (VDF) is a copolymer of VDF (polymer (VDF$_C$)) comprising recurring units derived from VDF and recurring units derived from at least one fluorinated monomer different from VDF monomer (F).

8. The method according to claim 7, wherein said monomer (F) is either a hydrogenated monomer (monomer (F$_H$)) or a fluorinated monomer (monomer (F$_F$)).

9. The method according to claim 8, wherein said monomer (F$_F$) comprises:
(a) C$_2$-C$_8$ fluoro- and/or perfluoroolefins;
(b) C$_2$-C$_8$ hydrogenated monofluoroolefins;
(c) CH$_2$=CH—R$_{f0}$, wherein R$_{f0}$ is a C$_1$-C$_6$ perfluoroalkyl group;
(d) chloro- and/or bromo- and/or iodo-C$_2$-C$_6$ fluoroolefins;
(e) CF$_2$=CFOR$_{f1}$, wherein R$_{f1}$ is a C$_1$-C$_6$ fluoro- or perfluoroalkyl group;
(f) CF$_2$=CFOX$_0$, wherein X$_0$ is a C$_1$-C$_{12}$ oxyalkyl group or a C$_1$-C$_{12}$ (per)fluorooxyalkyl group having one or more ether groups; and/or
(g) CF$_2$=CFOCF$_2$OR$_{f2}$, wherein R$_{f2}$ is a C$_1$-C$_6$ fluoro- or perfluoroalkyl group, or a C$_1$-C$_6$ (per)fluorooxyalkyl group having one or more ether groups;

(h) (per)fluorodioxoles of formula:

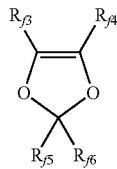

wherein each of R$_{f3}$, R$_{f4}$, R$_{f5}$ and R$_{f6}$, equal to or different from each other, is independently a fluorine atom, a C$_1$-C$_6$ fluoro- or per(halo)fluoroalkyl group, optionally comprising one or more oxygen atoms.

10. The method according to claim 9, wherein said monomer (FF) is selected from the group consisting of:
(a) tetrafluoroethylene (TFE), hexafluoropropylene (HFP), pentafluoropropylene and hexafluoroisobutylene;
(b) vinyl fluoride, 1,2-difluoroethylene and trifluoroethylene;
(c) CH2=CH—R$_{f0}$, wherein R$_{f0}$ is a C$_1$-C$_6$ perfluoroalkyl group;
(d) chlorotrifluoroethylene (CTFE);
(e) CF$_2$=CFOR$_{f1}$, wherein R$_{f1}$ is —CF$_3$, —C$_2$F$_5$, or —C$_3$F$_7$;
(f) CF$_2$=CFOX$_0$, wherein X$_0$ is a perfluoro-2-propoxypropyl group;
(g) CF$_2$=CFOCF$_2$OR$_{f2}$, wherein R$_{f2}$ is —CF$_3$, —C$_2$F$_5$, —C$_3$F$_7$ or —C$_2$F$_5$—O—CF$_3$; and
(h) (per)fluorodioxoles of formula:

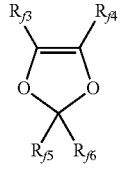

wherein each of R$_{f3}$, R$_{f4}$, R$_{d5}$, and R$_{f6}$, equal to or different from each other, is independently —F.

11. The method according to claim 7, wherein said polymer (VDFc) is crystalline or partially crystalline and comprises from 0.05% to 14.5% by moles of recurring units derived from said at least one monomer (F), with respect to the total moles of recurring units of polymer (VDF), and an amount of recurring units derived from VDF of at least 85.0 mol %, with respect to the total moles of recurring units of polymer (VDF).

12. The method according to claim 7, wherein said polymer (VDFc) is amorphous and comprises at least 10% moles and at most 45% moles of recurring units derived from HFP, with respect to all recurring units of said polymer (VDFc).

13. The method according to claim 1, wherein a polymer selected from the group consisting of polyether polymers, allyl polymers, and vinyl polymers is added either in step (I) or in step (II).

* * * * *